United States Patent
Usami

(10) Patent No.: US 10,095,003 B2
(45) Date of Patent: Oct. 9, 2018

(54) AUTOFOCUS APPARATUS, AUTOFOCUS METHOD, AND PROGRAM

(71) Applicant: MITUTOYO CORPORATION, Kanagawa (JP)

(72) Inventor: Atsushi Usami, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 188 days.

(21) Appl. No.: 14/854,393

(22) Filed: Sep. 15, 2015

(65) Prior Publication Data
US 2016/0094775 A1    Mar. 31, 2016

(30) Foreign Application Priority Data
Sep. 29, 2014  (JP) ................. 2014-197873

(51) Int. Cl.
G02B 7/36    (2006.01)
G02B 21/24   (2006.01)
G02B 15/14   (2006.01)
G02B 13/16   (2006.01)
G02B 21/36   (2006.01)

(52) U.S. Cl.
CPC ............. *G02B 7/36* (2013.01); *G02B 21/244* (2013.01); *G02B 21/245* (2013.01); *G02B 13/16* (2013.01); *G02B 15/14* (2013.01); *G02B 21/365* (2013.01)

(58) Field of Classification Search
CPC ....... G02B 7/36; G02B 21/244; G02B 21/245
See application file for complete search history.

(56) References Cited

U.S. PATENT DOCUMENTS 4,935,612 A * 6/1990 Bierleutgeb ........... G02B 21/00
                                              250/201.2
6,040,909 A * 3/2000 Hasegawa ........... G03F 7/70691
                                              250/548

(Continued)

FOREIGN PATENT DOCUMENTS

JP     05-107463     4/1993
JP     H09-304685    11/1997

(Continued)

OTHER PUBLICATIONS

Mar. 6, 2018 Notification of Reasons for Refusal in Japanese Patent Application No. 2014-197873.

*Primary Examiner* — Christopher G Findley
(74) *Attorney, Agent, or Firm* — Greenblum & Bernstein, P.L.C.

(57) ABSTRACT

An autofocus apparatus according to an embodiment of the present invention is provided with an image acquirer, a pattern controller, and a focus controller. The image acquirer includes an optical system which forms an image of an object at a predetermined magnification and an image capturer which photographs the image of the object formed by the optical system. The pattern controller includes a generator which generates a pattern in a size according to the predetermined magnification of the optical system and a projector which projects the pattern generated by the generator onto the object. In the focus controller, an image of the projected pattern formed by the optical system at the predetermined magnification controls a focus position of the optical system based on the image of the object photographed by the image capturer.

12 Claims, 9 Drawing Sheets

(56) References Cited

U.S. PATENT DOCUMENTS

| | | | | |
|---|---|---|---|---|
| 6,075,558 | A * | 6/2000 | Tachibana | G02B 21/244 348/80 |
| 6,839,127 | B1 * | 1/2005 | Anderson | G01C 3/08 356/5.01 |
| 7,064,810 | B2 * | 6/2006 | Anderson | G01S 7/4814 356/5.01 |
| 2015/0001373 | A1 | 1/2015 | Udo | |
| 2015/0001374 | A1 | 1/2015 | Udo | |
| 2015/0346475 | A1 | 12/2015 | Moriuchi et al. | |

FOREIGN PATENT DOCUMENTS

| | | |
|---|---|---|
| JP | 2004-165841 A | 6/2004 |
| JP | 2010-008458 A | 1/2010 |
| JP | 2014-115318 A | 6/2014 |

* cited by examiner

High Magnification

Intermediate Magnification

Low Magnification

AUTOFOCUS APPARATUS, AUTOFOCUS METHOD, AND PROGRAM

CROSS-REFERENCE TO RELATED APPLICATIONS

The present application claims priority under 35 U.S.C. § 119 of Japanese Application No. 2014-197873, filed on Sep. 29, 2014, the disclosure of which is expressly incorporated by reference herein in its entirety.

BACKGROUND OF THE INVENTION

1. Field of the Invention

The present invention relates to an autofocus apparatus, an autofocus method, and a program which can be utilized in a system which photographs an image of an object for purposes of measurement and observation and the like, for example.

2. Description of Related Art

Conventionally, a system for performing observation and measurements and the like is known, in which an image obtained by photographing an object is processed by a computer. Such a system is employed in digital microscopes, CNC (computer numerical control) image measuring apparatuses and the like, for example.

Japanese Patent Laid-open Publication No. Hei 09-304685 discloses an autofocus apparatus which can be applied to the above-mentioned digital microscopes, image measuring apparatuses and the like. In the autofocus apparatus disclosed in Japanese Patent Laid-open Publication No. Hei 09-304685, a predetermined pattern is projected onto a measurement surface of a measured object. Autofocusing is performed based on contrast information of a photographed image of the predetermined pattern. This enables focusing on measured objects of various materials without being restricted by the material of the measured object (see, for example, paragraphs [0004], [0019], and [0020] of Japanese Patent Laid-open Publication No. Hei 09-304685).

In order to perform measurements and observations with high precision, photographing is frequently performed by changing a magnification of an optical system which includes an objective lens and the like. Thus, it is required that autofocusing can be performed with high precision even when the magnification of the optical system is changed.

In view of the above circumstance, an advantage of the present invention is an autofocus apparatus, an autofocus method, and a program in which autofocusing can be performed with high precision even when the magnification is changed.

SUMMARY OF THE INVENTION

An autofocus apparatus according to an embodiment of the present invention is provided with an image acquirer, a pattern controller, and a focus controller.
The image acquirer includes an optical system which forms an image of an object at a predetermined magnification and an image capturer which photographs the image of the object formed by the optical system. The pattern controller includes a generator which generates a pattern in a size according to the predetermined magnification of the optical system and a projector which projects the pattern generated by the generator onto the object. In the focus controller, an image of the projected pattern formed by the optical system at the predetermined magnification controls a focus position of the optical system based on the image of the object photographed by the image capturer.

In this autofocus apparatus, the pattern is formed in the size according to the magnification of the optical system which forms the image of the object, and the pattern is then projected onto the object. The image of the projected pattern is formed by the optical system at the predetermined magnification and then photographed by the image capturer. The focus position of the optical system is controlled based on the photographed image of the pattern. This enables highly precise autofocusing even when the magnification is changed.

The generator may change the size of the pattern according to the change in magnification of the optical system. This enables highly precise autofocusing even when the magnification is changed.

The generator may decrease the size of the pattern in accordance with an increase of the magnification of the optical system and increase the size of the pattern in accordance with a decrease of the magnification of the optical system. Thus, control of the focus position is not affected by, for example, the formed pattern image becoming too large or too small.

The generator may change the size of the pattern such that the size of the formed pattern image is substantially constant even when the magnification of the optical system is changed. This enables highly precise autofocusing even when the magnification is changed.

The generator may include a light modulation element capable of generating the pattern in a changed size based on incident light. By employing the light modulation element, it is possible to change the size of the projected pattern with high precision.

The light modulation element may be a micromirror device. Employing the micromirror device improves utilization efficiency of light.

The light modulation element may be a liquid crystal panel. By employing the liquid crystal panel, the apparatus can be realized in a simple configuration.

The generator may include a generation member which generates the pattern in a predetermined size and a zoom lens which changes the size of the pattern generated by the generation member. In this way, the pattern may be generated in the predetermined size and then the size of the pattern may be changed by the zoom lens.

An autofocus method according to an embodiment of the present invention includes forming an image of an object to be photographed by an optical system, generating a pattern in a size according to a predetermined magnification of the optical system, and projecting the pattern onto the object. The focus position of the optical system is controlled based on the photographed image of the projected pattern, the image of the projected pattern being formed by the optical system at the predetermined magnification.

A program according to an embodiment of the present invention causes the autofocus apparatus to perform the following steps:
detecting the magnification of the optical system forming an image of the object;
calculating the size of the pattern based on the detected magnification;
generating the pattern in the calculated size and projecting the pattern onto the object; and
controlling the focus position of the optical system based on the photographed image of the projected pattern, the image of the projected pattern being formed by the optical system at the detected magnification.

As described above, according to the present invention, autofocusing can be performed with high precision even when the magnification of the optical system is changed. It is noted that the effects of the present invention described herein are not necessarily limited, and may be at least one of the effects disclosed herein.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

An embodiment of the present invention is described below with reference to the drawings.

Configuration of the Image Measuring Apparatus

Figure 1:
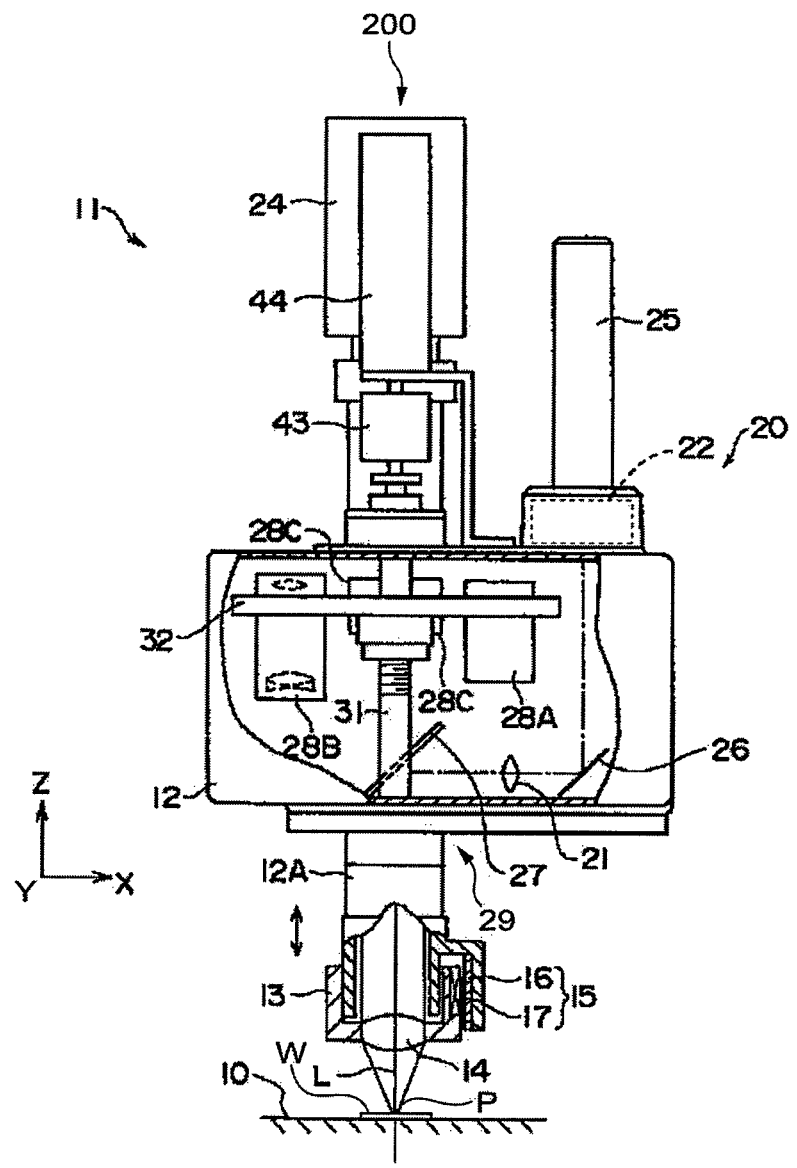
FIG. 1 is a schematic view illustrating a configuration example of an image measuring apparatus according to an embodiment of the present invention.

FIG. 1 is a schematic view illustrating a configuration example of an image measuring apparatus according to an embodiment of the present invention. An autofocus apparatus according to an embodiment of the present invention is incorporated into an image measuring apparatus 200. Parts configuring the autofocus apparatus will be explained in detail below.

The image measuring apparatus 200 includes a stage 10 on which a work piece (object) W may be placed, the stage 10 being displaceable in an X direction and a Y direction (left-right direction in FIG. 1); and an optical system unit 11 provided as to be displaceable in an Z axis direction (up-down direction in FIG. 1) relative to the stage 10. The specific configuration to render the stage 10 and the optical system unit 11 to be displaceable is not limited. An arbitrary configuration in which the stage 10 and the optical system unit 11 are displaceable relative to each other in each direction may be employed.

The optical system unit 11 includes a casing 12, an objective lens holder 13, a CCD camera 24, and an illuminator 25. The objective lens holder 13 is connected to a cylinder 12A of the casing 12 via an actuator 15. The actuator 15 includes a magnet 16 fixed to a cylinder 12A side of the actuator 15 and a coil 17 fixed to an objective lens holder 13 side of the actuator 15. When the actuator 15 is operated, the objective lens holder 13 is caused to be displaced in an optical axis L direction (Z axis direction).

As illustrated in FIG. 1, an objective lens 14 is held by the objective lens holder 13 such that the objective lens 14 is positioned on the optical axis L. As the objective lens holder 13 is displaced, the objective lens 14 is displaced in the optical axis L direction. In the present embodiment, a focus position P of an image forming optical system 29, which includes the objective lens 14, is controlled by the displacement of the objective lens 14. The optical axis L corresponds to an optical axis of the image forming optical system 29.

The CCD camera 24 is arranged on an upper portion side of the casing 12 and on the optical axis L. The CCD camera 24 serves as an image capturer which photographs an image of the work piece W, the image of the work piece W being formed by the image forming optical system 29. Other digital cameras, such as CMOS cameras and the like, may be used instead of the CCD camera 24. The illuminator 25 is also arranged on the upper portion side of the casing 12. An arbitrary light source, such as a solid light source (such as an LED) or a mercury lamp, may be employed as the light source which emits illumination light.

A mirror 26 formed below the illuminator 25 and a beam splitter 27 arranged on the optical axis L are provided inside the casing 12. The mirror 26 reflects the illumination light emitted from the illuminator 25 toward the optical axis L at a substantially right angle. The beam splitter 27 reflects the illumination light reflected by the mirror 26 toward the objective lens 14, which is on the optical axis L. In addition, the beam splitter 27 transmits light reflected by the work piece W along the optical axis L direction.

Tube lenses (imaging lenses) 28A, 28B, and 28C having different magnifications (for example, 1×, 2×, 6×), a turret 32 holding the plurality of the tube lenses 28A to 28C, and a shaft 31 connected to a center of the turret 32 are arranged inside the casing 12. The shaft 31 is provided so as to be parallel to but in a different position from the optical axis L, and the turret 32 is provided so as to be rotatable around the shaft 31. The three tube lenses 28A to 28C are attached at equal intervals around the circumference of a circle, a radius of the circle being a distance from the shaft 31 to the optical axis L.

The shaft 31 is connected to a drive motor 44 arranged on the upper portion side of the casing 12 via a clutch 43. Operation of the drive motor 44 causes the turret 32 to rotate, thereby enabling a switching of the tube lenses 28. Thus, at least one of the plurality of the tube lenses 28A to 28C is selectively arranged on the optical axis L.

A method and configuration to position the turret 32 at an angle position in which the tube lenses 28 are in line with the optical axis L are not limited. For example, the positioning of the turret 32 may be determined by notches, formed at predetermined positions on the turret 32, engaging with protrusions formed at predetermined positions on a casing 12 side. In addition, a sensor or the like which detects a rotation angle of the turret 32 may be employed as appropriate.

The image measuring apparatus 200 includes a pattern controller 20 which generates a pattern for purposes of performing autofocusing and projects the pattern onto the work piece W. In the present embodiment, the pattern controller 20 includes the illuminator 25, a pattern generator 22, the mirror 26, a projection lens 21, and the beam splitter 27. Thus, the illuminator 25, the mirror 26, and the beam splitter 27 are operated when the work piece W is irradiated with illumination light and also when the pattern is projected onto the work piece W. It is noted that an illuminating apparatus which emits light for use in pattern generation may be provided separately from the illuminator 25. A specific configuration of the pattern controller 20 will be explained in detail below.

Figure 2:
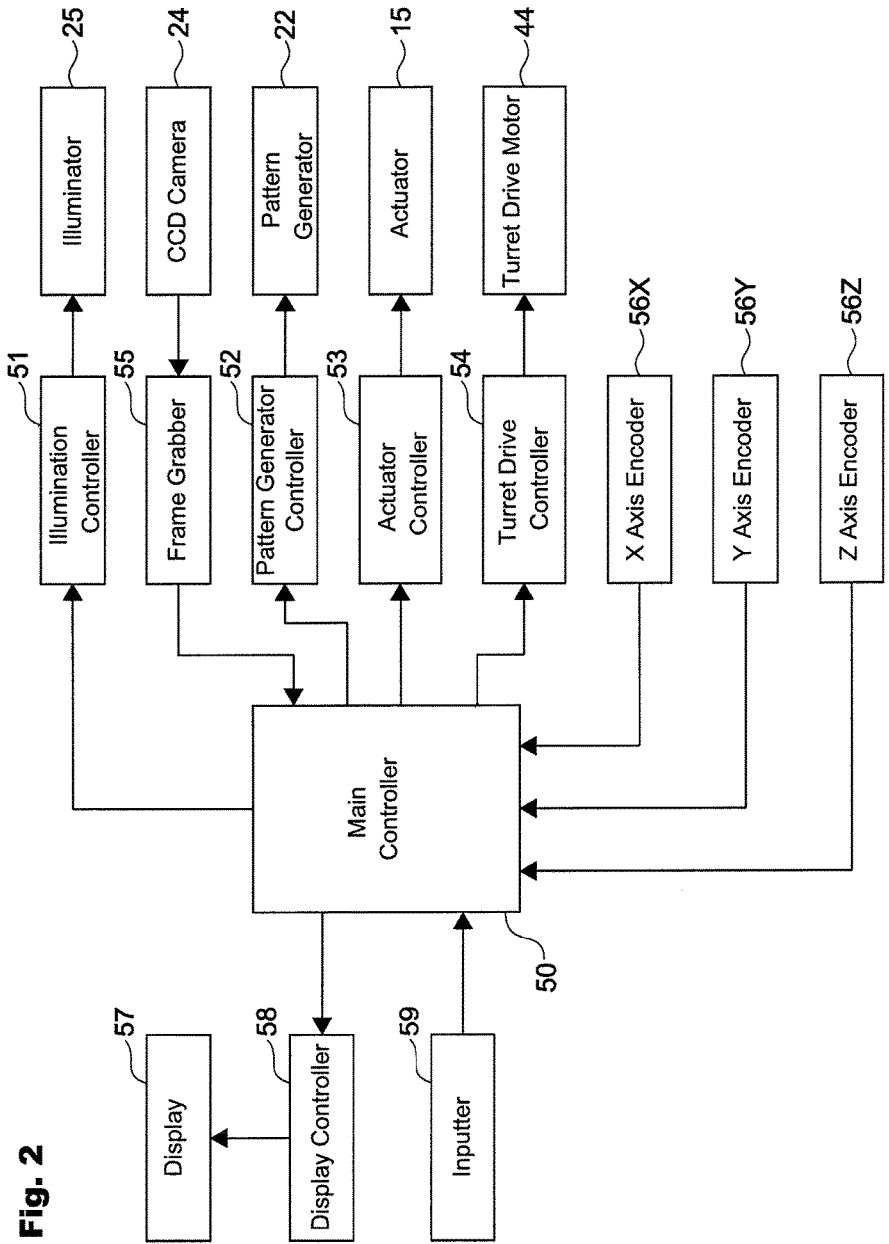
FIG. 2 is a block diagram illustrating a configuration example of a control system of the image measuring apparatus.

FIG. 2 is a block diagram illustrating a configuration example of a control system of the image measuring apparatus 200. As illustrated in FIG. 2, the image measuring apparatus 200 includes a main controller 50 which controls operation of each mechanism of the apparatus. Controllers (marked as 51 to 54) are connected to the main controller 50, each of the controllers controlling the illuminator 25, the pattern generator 22, the actuator 15, and the drive motor 44, respectively.

In addition, a frame grabber 55, an X axis encoder 56X, a Y axis encoder 56Y, and a Z axis encoder 56Z are connected to the main controller 50. The frame grabber 55 fetches a photographed image photographed by the CCD camera 24. The X and the Y encoders 56X and 56Y detect each position of the stage 10 in the X and the Y directions. The Z axis encoder 56Z detects the position of the optical system unit 11 in a Z direction (position of the objective lens 14 in the Z direction).

Further, a display controller 58, which controls a display 57; and an inputter 59 into which user commands are inputted, are connected to the main controller 50. Liquid crystal, EL (electroluminescence) and the like may be used in the display 57. The inputter 59 is configured by input devices such as, for example, touch panels and buttons.

The main controller 50 includes, for example, a CPU (central processing unit), a RAM (random access memory), and a ROM (read only memory) and the like. Various types of processes are performed by the CPU loading a program onto the RAM and executing the program, the program being stored on the ROM in advance. The specific configuration of the main controller 50 is not limited, and arbitrary hardware and software may be employed as appropriate.

In the image measuring apparatus 200 having a configuration as described above, the objective lens 14, the beam splitter 27, and the tube lenses 28 serve as the image forming optical system 29 which forms an image of the work piece W at a predetermined magnification. An image acquirer according to the present embodiment is realized by the image forming optical system 29 and the CCD camera 24 serving as the image capturer.

In addition, of the elements included in the pattern controller 20, a "generator" according to the present embodiment is realized by the illuminator 25 and the pattern generator 22. In addition, a "projector" according to the present embodiment is realized by the mirror 26, the projection lens 21, and the beam splitter 27.

In addition, a focus controller according to the present embodiment is realized when a predetermined program is executed by the CPU of the main controller 50. The image acquirer, the pattern controller 20, and the focus controller are the elements which serve as the autofocus apparatus in the present embodiment.

Additionally, a magnification information acquiring step (a step in which magnification information is acquired), a pattern size calculation step (a step in which a size of the pattern is calculated), a pattern projection step (a step in which the pattern is projected), and a focus position control step (a step in which the focus position is controlled) are performed by the CPU operating in accordance with the predetermined program. Thus, the main controller 50 also serves as an information processing apparatus which performs autofocusing according to the present invention. In addition, the main controller 50 is capable of performing autofocusing as an information processing method following a program according to the present invention.

The ROM and the like of the main controller 50 can operate as a memory, and a table and the like to calculate the size of the pattern is stored on the ROM, in addition to the program. An HDD (hard drive disk) and the like may be provided separately from the main controller 50 to serve as the memory.

Figure 3:
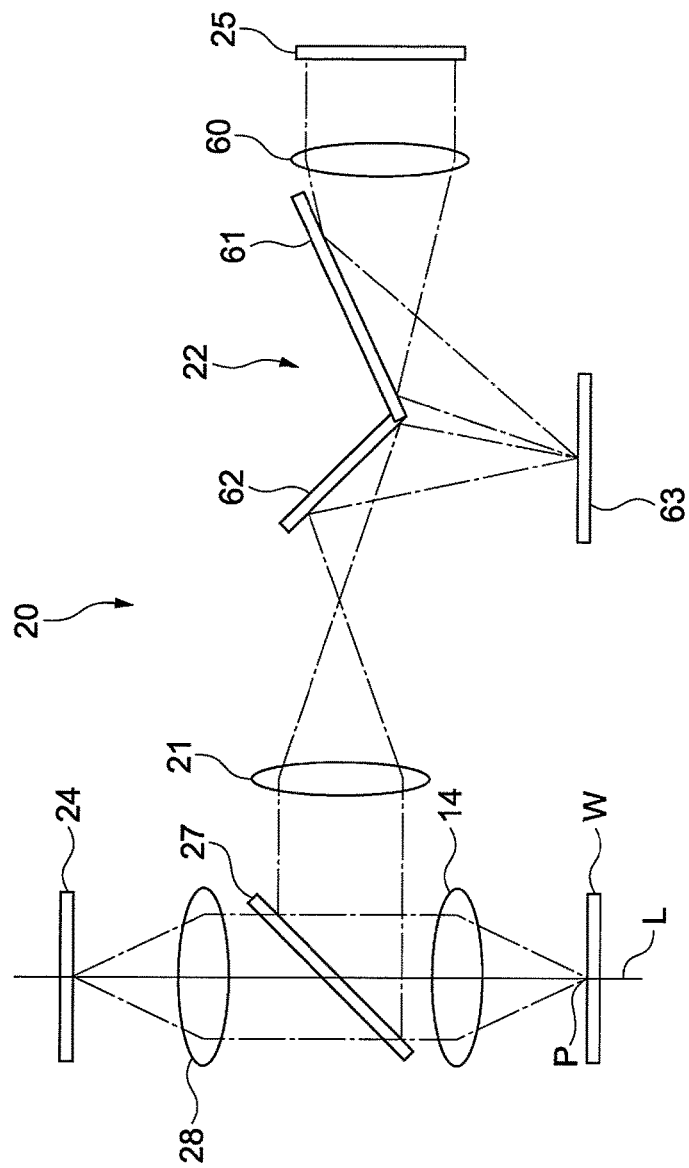
FIG. 3 is a schematic view illustrating a specific configuration example of a pattern controller.

FIG. 3 is a schematic view illustrating a specific configuration example of the pattern controller 20. As described above, the pattern controller 20 includes the illuminator 25, the pattern generator 22, the mirror 26, the projection lens 21, and the beam splitter 27. In FIG. 3, illustration of the mirror 26 is omitted, and the illuminator 25, the pattern generator 22, the projection lens 21, and the beam splitter 27 are arranged on a substantially straight line. Additionally, FIG. 3 illustrates the work piece W, the objective lens 14, the tube lenses 28, and the CCD camera 24 aligned along the optical axis L.

The pattern generator 22 includes a condenser lens 60, a first and a second reflecting mirrors 61 and 62, and a reflective digital micromirror device (DMD) 63. The DMD 63 is an element in which a plurality of micromirrors corresponding to a pixel is aligned on a flat surface. An inclination angle of each of the micromirrors of the DMD 63 is controlled such that each of the micromirrors can enter into an ON mode or an OFF mode with respect to incident light. For example, a micromirror of the DMD 63 can enter into the ON mode when the inclination angle of the micromirror relative to a predetermined reference direction is controlled to be $+\alpha$ degrees; thereby reflecting incident light toward a projection object. On the other hand, the micromirror of the DMD 63 can enter into the OFF mode when the inclination angle of the micromirror is controlled to be $-\alpha$ degrees; thereby reflecting incident light toward an interceptor or the like, which intercepts light.

By causing a predetermined micromirrors of the plurality of the micromirrors of the DMD 63 to be in the ON mode, a pattern having an arbitrary shape and size can be generated. In addition, by rapidly switching the micromirrors between the ON/OFF modes, it is possible to control the luminance of the image to be projected (corresponding pixel). In the present embodiment, the DMD 63 can serve as a light modulation element capable of generating the pattern in a changed size based on incident light.

Light from the illuminator 25 irradiates the plurality of the micromirrors of the DMD 63 via the condenser lens 60 and the first reflecting mirror 61 illustrated in FIG. 3. Then, light reflected by the micromirrors of the DMD 63 which are in the ON mode irradiates the projection lens 21 via the second reflecting mirror 62. Thus, the pattern generated by the DMD 63 is projected onto the work piece W via the projection lens 21 and the beam splitter 27.

Figure 4:
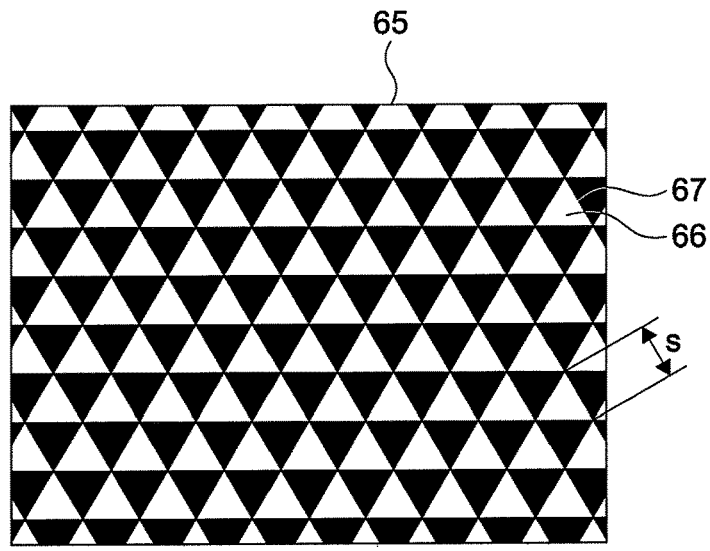
FIG. 4 illustrates one example of a pattern generated by a pattern generator.

FIG. 4 illustrates one example of the pattern generated by the pattern generator 22. In the present embodiment, a pattern 65, in which a plurality of equilateral triangles 66 are two-dimensionally arranged so that equilateral triangles adjacent to each other via a side 67 are of different colors (luminance) from each other, is generated. A size S of the pattern 65 is typically defined by the size of the arranged equilateral triangles 66. For example, the size S of the pattern 65 is defined by the length of one side 67 of the equilateral triangle 66. Alternatively, the size S of the pattern 65 may be defined by a distance between one apex of the equilateral triangle 66 and the opposing side 67.

Additionally, in the present embodiment, one of the adjacent equilateral triangles 66 is white (highest luminance) and the other is black (lowest luminance). The colors of the equilateral triangles 66 are not limited to white and black, and gray (intermediate luminance) and the like may be used as appropriate as long as adjacent equilateral triangles are of different colors from each other. The colors used (luminance) may be set as appropriate so that the luminance changes at the boundary area between adjacent equilateral triangles 66. It is noted that colors such as RGB and the like may be used as appropriate in a case where color images can be generated.

Operation of the Image Measuring Apparatus

Figure 5:
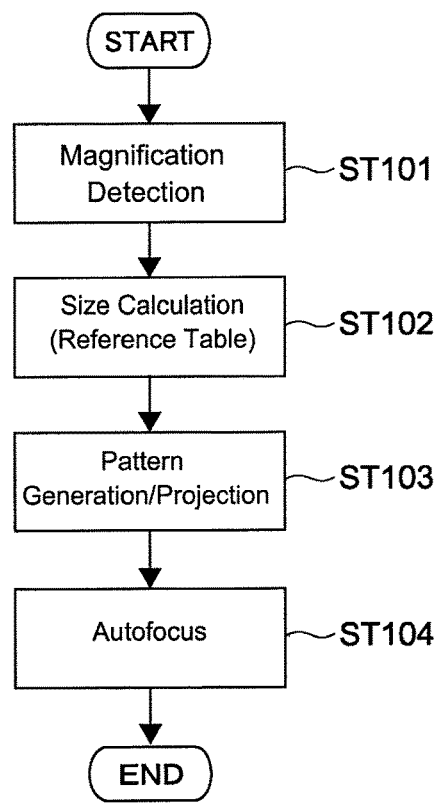
FIG. 5 is a flowchart illustrating an example of an autofocusing process.

An operation of the image measuring apparatus 200 primarily when performing autofocusing will be explained. FIG. 5 is a flowchart illustrating an example of an autofocusing process.

First, the magnification of the image forming optical system 29 is detected (step 101). For example, if the objective lens 14 is fixed, a type of the tube lens 28 arranged on the optical axis L is detected. This is automatically detected from the rotational position and the like of the turret 32. Thus, the magnification of the image forming optical system 29 is detected (calculated) based on the magnification of the objective lens 14 and the magnification of the tube lens 28 arranged on the optical axis L.

In a case where the objective lens 14 is exchangeable, the type or the magnification of the objective lens 14 mounted on the objective lens holder 13, for example, is inputted into the inputter 59 by the user. The magnification of the image forming optical system 29 is detected based on the input information. Alternatively, the objective lens 14 to be mounted may be automatically identifiable, and the magnification of the image forming optical system 29 may be detected based on the identification result. An arbitrary technology may be employed as a method and configuration to automatically identify the objective lens 14.

It is noted that parameters resulting from other optical members and the like may be used to calculate the magnification of the image forming optical system 29, in addition to the magnification of the objective lens 14 and the tube lenses 28. In addition, a table may be stored in the memory configured by the ROM and the like of the main controller 50, the table storing combinations of the objective lens 14 and each of the tube lenses 28 and the magnification of the image forming optical system 29 corresponding to each combination. The magnification of the image forming optical system 29 can be detected easily by referencing such a table. Various methods may be employed in addition to the above.

The size S of the pattern 65 is calculated (step 102). In other words, the size S of the pattern 65 according to the magnification of the image forming optical system 29 (corresponding to the "predetermined magnification" when forming the image of the work piece W) is calculated.

Figure 6A:
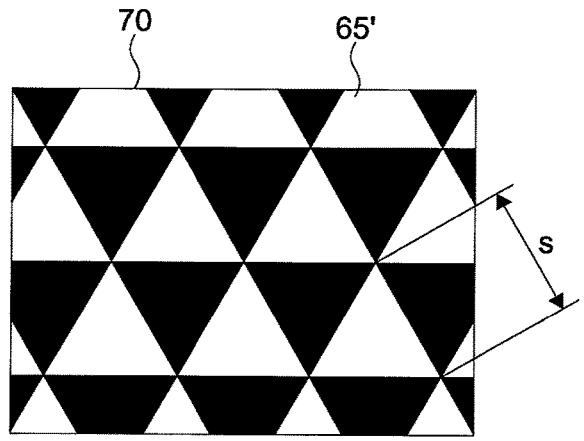
FIGS. 6A to 6C are each a frame view illustrating a photographed image of an image of a pattern photographed by a CCD camera.
Figure 6B:
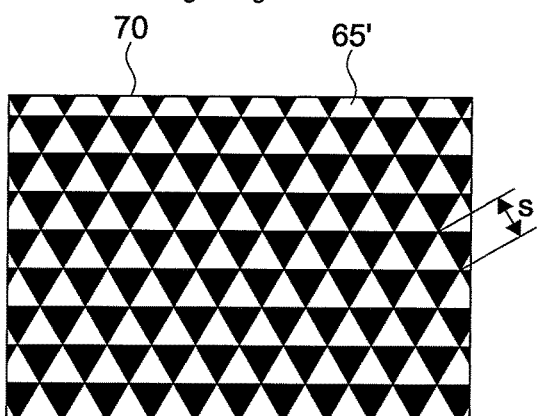
Figure 6C:
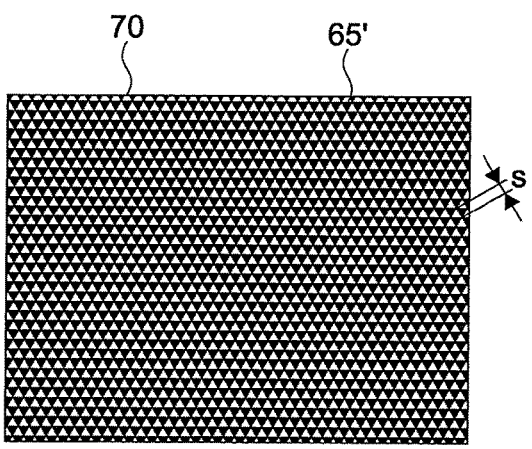

Each of FIGS. 6A to 6C is a drawing describing the size S of the pattern 65 according to the magnification of the image forming optical system 29, and is a frame view illustrating a photographed image 70 of an image of the pattern 65 photographed by the CCD camera 24. When the pattern 65 is projected onto the work piece W by the pattern controller 20, the image of the pattern 65 is formed by the image forming optical system 29 at the predetermined magnification. Then, the formed image of the pattern 65 is photographed by the CCD camera 24.

As illustrated in FIGS. 6A to 6C, a size S of a pattern 65' displayed in the photographed image 70 differs according to the magnification of the image forming optical system 29. For example, the size S of the pattern 65' increases when the magnification of the image forming optical system 29 is high (FIG. 6A) and decreases when the magnification of the image forming optical system 29 is low (FIG. 6C). When the magnification of the image forming optical system 29 is an intermediate size, the size S of the pattern 65' will also become an intermediate size (FIG. 6B).

Adjustment of the focus position of the image forming optical system 29 is carried out based on a contrast of the photographed image 70 illustrated in FIGS. 6A to 6C. As illustrated in FIGS. 6A to 6C, when the size S of the pattern 65' in the photographed image 70 changes according to the magnification of the image forming optical system 29, contrast information obtained from the photographed image 70 also changes. As a result, focus precision may vary depending on the magnification of the image forming optical system 29. Further, sufficient focus precision may not be achieved at high/low magnifications.

In order to resolve these circumstances, in the present invention, the size S of the pattern 65 according to the magnification of the image forming optical system 29 is calculated. In other words, the size S of the pattern 65 is changed in accordance with a change in the magnification of the image forming optical system 29. This enables highly precise autofocusing even when the magnification of the image forming optical system 29 is changed.

Typically, the size S of the pattern 65 is set to decrease as the magnification of the image forming optical system 29 increases. The size S of the pattern 65 is set to increase as the magnification of the image forming optical system 29 decreases. Thus, control of the focus position is not affected by, for example, the formed image of the pattern 65 (the pattern 65') becoming too large or too small.

The size of the pattern 65 may be changed such that the size S of the formed image of the pattern 65 is a substantially constant size, even when the magnification of the image forming optical system 29 is changed. For example, the size of the pattern 65 may be changed so that the size of the pattern 65 has an inversely proportional relationship with the magnification of the image forming optical system 29 detected in step 101. In other words, the pattern 65 is generated in a reference size S relative to a reference magnification of the image forming optical system 29. The reference size S is a size at which the contrast of the photographed image 70 can be properly calculated, for example. Control is implemented so that an inversely proportional relationship is realized between a change of the magnification from the reference magnification and a change of the size S from the reference size.

This is not limited to a case where the size S of the pattern 65' in the photographed image 70 is maintained at a substantially constant size. For example, the size S of the pattern 65 may be controlled so that changes to the size S of the pattern 65' in the photographed image 70 caused by changes in the magnification of the image forming optical system 29 fall within a permitted range. The permitted range is a range in which the contrast of the photographed image 70 can be properly calculated. A reference for determining whether the contrast will be properly calculated may be individually set as appropriate for every image measuring apparatus 200 used, based on a desired focusing precision and the like.

The calculation of the size S of the pattern 65 is performed by referencing a table, for example. A table is stored in the memory configured by the ROM and the like of the main controller 50, the table storing each of the magnifications of the image forming optical system 29 and the size S of the pattern 65 corresponding to each magnification of the image forming optical system 29. The size S of the pattern 65 according to the magnification of the image forming optical system 29 can be calculated easily by referencing this table. Of course, other methods may be employed as well.

The DMD 63 is controlled and the pattern 65 is generated at the size S calculated in step 102. The pattern 65 generated is projected onto the work piece W (step 103). Autofocusing is performed based on the photographed image 70 of the projected pattern 65 (step 104). Specifically, the objective lens 14 is displaced to a position where the contrast of the photographed image 70 becomes highest. This causes the focus position of the image forming optical system 29 to be automatically adjusted. When the image forming optical system 29 is focused, projection of the pattern 65 is released, and a photographed image of the work piece W is generated. A dimension and shape and the like of the work piece W are measured based on the photographed image of the work piece W.

As described above, in the image measuring apparatus 200 according to the present embodiment, the pattern 65 is generated at the size S according to the magnification of the image forming optical system 29, which forms the image of the work piece W, and then the pattern 65 is projected onto the work piece W. The image of the projected pattern 65 is formed by the image forming optical system 29 at the predetermined magnification and then photographed by the CCD camera 24. The focus position of the image forming optical system 29 is controlled based on the photographed image 70 of the pattern 65. This enables highly precise autofocusing even when the magnification is changed. It is noted that image-formation at the predetermined magnification includes both a case in which the image of the work piece W is enlarged from an actual size of the work piece W and a case in which the image of the work piece W is reduced from the actual size of the work piece W.

Figure 7:
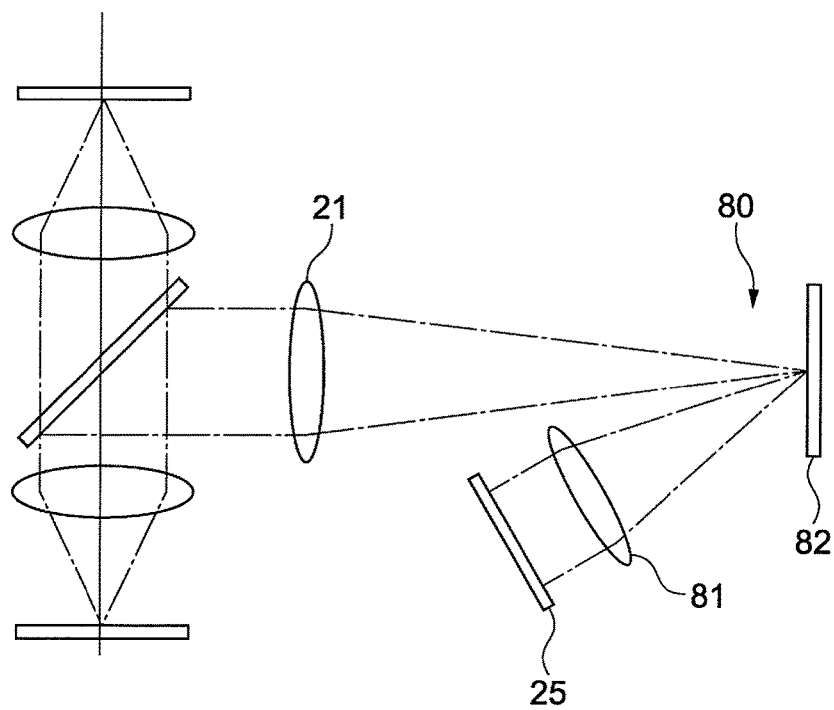
FIG. 7 is a schematic view of another configuration example where a DMD is used as a light modulation element.

FIG. 7 is a schematic view of a configuration example where a DMD is used as the light modulation element. A pattern generator 80 illustrated in FIG. 7 includes a condenser lens 81 and a DMD 82, and an arrangement of the condenser lens 81, the DMD 82, and the illuminator 25 is set as appropriate. In other words, the illuminator 25 and the condenser lens 81 are arranged in positions such that the DMD 82 is directly irradiated by illumination light via the condenser lens 81. The DMD 82 is arranged in a position such that light reflected by the micromirrors of the DMD 82 in the ON mode directly irradiates the projection lens 21. By employing such a configuration, the first and the second reflecting mirrors 61 and 62 can be omitted, thereby simplifying the configuration and reducing costs of parts and the like.

Other Embodiments

The present invention is not limited to the above-described embodiments and other various embodiments may be realized.

Figure 8A:
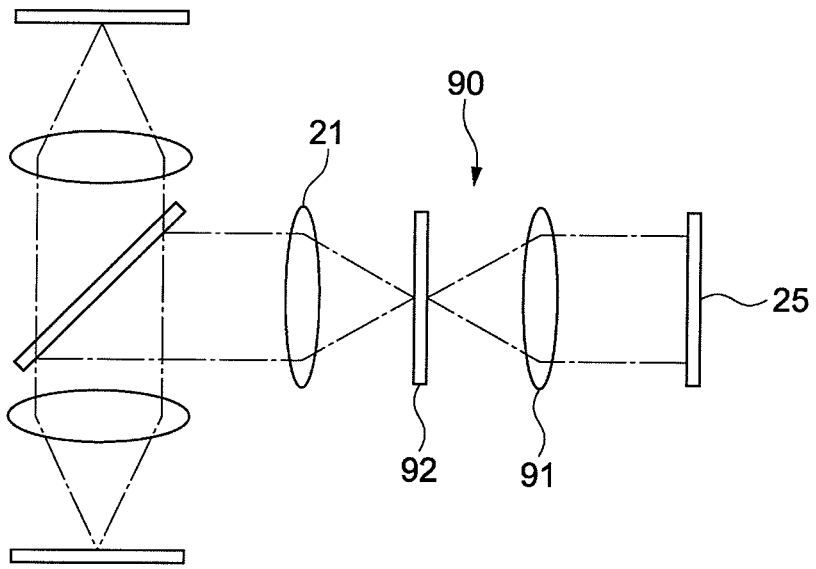
FIGS. 8A and 8B are each a schematic view of a configuration example where a liquid crystal panel is used as the light modulation element.
Figure 8B:
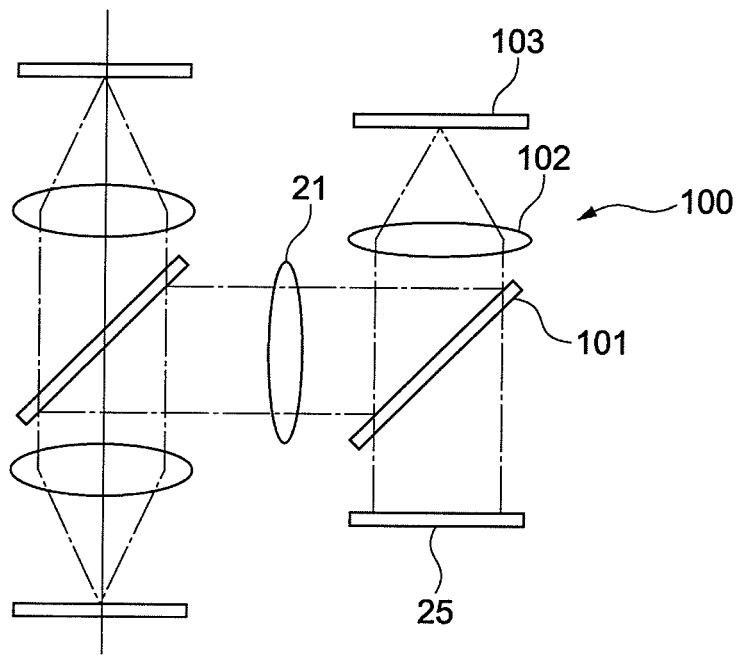

FIGS. 8A and 8B are each a schematic view of a configuration example where a liquid crystal panel is used as the light modulation element. A pattern generator 90 illustrated in FIG. 8A includes a condenser lens 91 and a transmissive liquid crystal panel 92. The illumination light emitted from the illuminator 25 irradiates the liquid crystal panel 92 via the condenser lens 91. A pattern according to the magnification of the image forming optical system is generated by the liquid crystal panel 92 and is then irradiated to the projection lens 21.

A pattern generator 100 illustrated in FIG. 8B includes a beam splitter 101, a condenser lens 102, and a reflective liquid crystal panel 103. The illumination light from the illuminator 25 is transmitted through the beam splitter 101 and then irradiates the liquid crystal panel 103 via the condenser lens 102. A pattern according to the magnification of the image forming optical system is generated by the liquid crystal panel 103 and then emitted toward the beam splitter 101. The beam splitter 101 reflects the pattern emitted from the liquid crystal panel 103 toward the projection lens 21. As illustrated in FIGS. 8A and 8B, transmissive and reflective liquid crystal panels may be used as the light modulation element.

By employing light modulation elements such as DMDs and liquid crystal panels, it is possible to change and generate the pattern to be projected onto the work piece with high precision. It is noted that the specific configuration of the optical system which guides the illumination light from the DMD, the liquid crystal panel, and the illuminator and the generated pattern is not limited; thus, an arbitrary configuration may be employed. Additionally, arbitrary optical members and the like may be employed as appropriate.

When a liquid crystal panel is used as the light modulation element, polarizers and analyzers and the like are frequently used as the optical members, and light quantity may be lost at these optical members. Thus, utilization efficiency of the emitted light from the illuminator may decrease. However, when an illuminating device having a high luminance is used as a countermeasure, costs may increase and issues due to heat generating from the illuminating device may occur.

When a DMD is used as the light modulation element, the above-described polarizers and analyzers become unnecessary, thereby enabling efficient utilization of the emitted light from the illuminator. Thus, the above-described issues can be prevented. On the other hand, by using a transmissive or reflective liquid crystal panel as the light modulation element, the apparatus may be assembled in a simple configuration and flexibility in design can be enhanced. It is noted that light modulation elements other than DMDs and liquid crystal panels may be employed.

Figure 9:
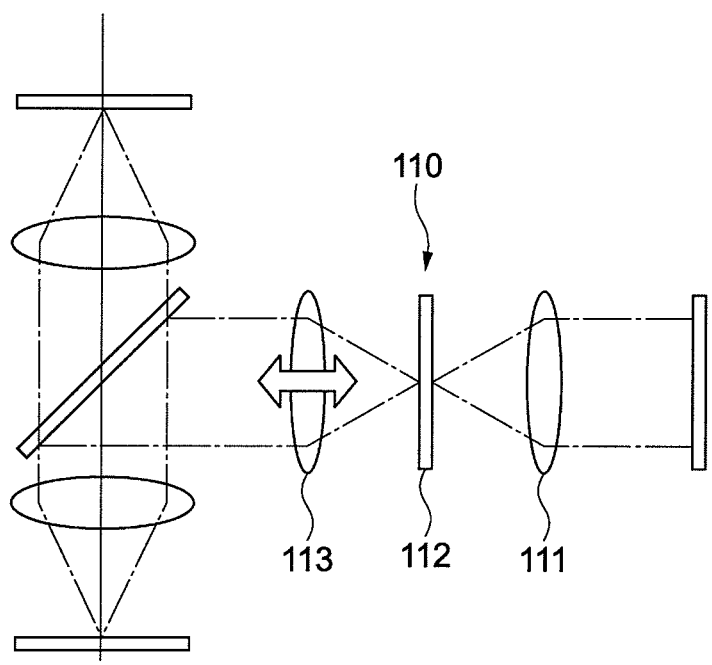
FIG. 9 is a schematic view of a configuration example of another embodiment of the pattern generator.

FIG. 9 is a schematic view of a configuration example of another embodiment of the pattern generator. A pattern generator 110 includes a condenser lens 111, a generation member 112 which generates a pattern at a predetermined size, and a zoom lens 113 which changes the size of the pattern generated by the generation member 112. A projection plate on which a pattern in a constant size is drawn, such as a reticle, is used as the generation member 112. Alternatively, a liquid crystal plate capable of generating only a predetermined pattern by energization can be used. A zoom position of the zoom lens 113 is controlled by the main controller 50, thereby enabling generation of the pattern in the size according to the magnification of the image forming optical system. By employing such a configuration, the apparatus and controls may be simplified.

In addition, the light modulation element (DMD, liquid crystal panel and the like) and the zoom lens may be used together as the pattern generator. Further changing the size of the pattern by the zoom lens, in addition to the size change by the light modulation element, enables fine adjustment and the like of the pattern size. As a result, it is possible to enhance precision of pattern generation.

Figure 10A:
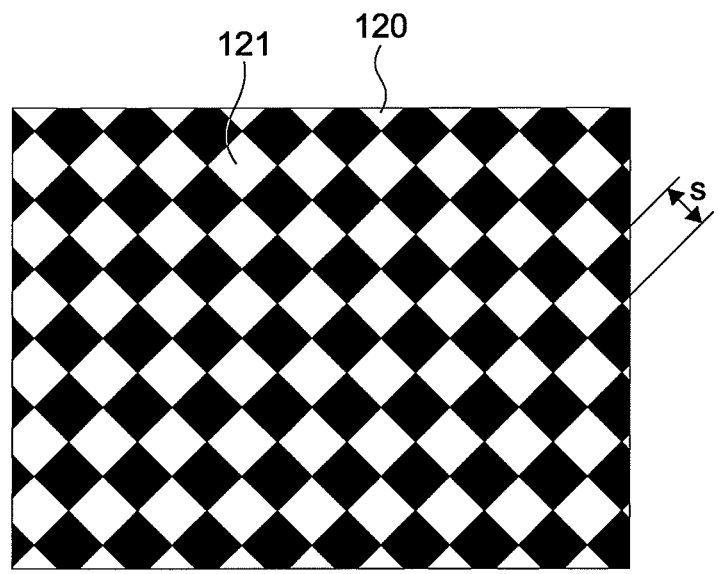
FIGS. 10A and 10B each illustrate another example of the pattern generated by the pattern generator.
Figure 10B:
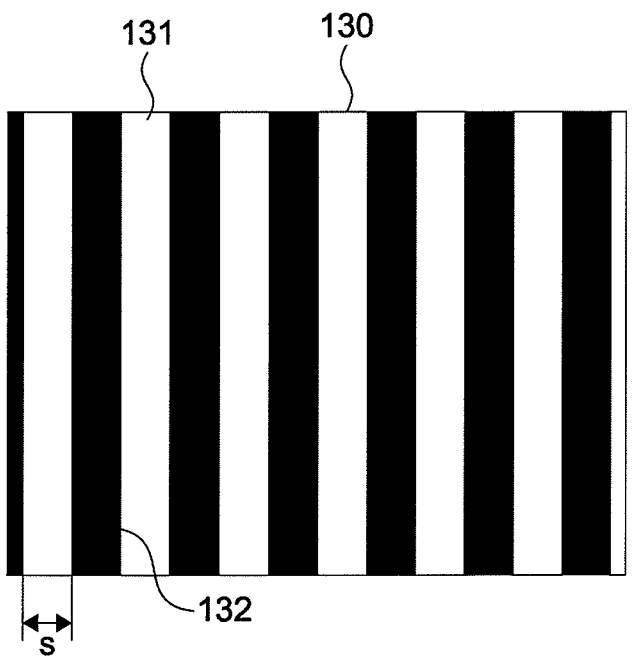

FIGS. 10A and 10B each illustrate another example of the pattern generated by the pattern generator. A pattern 120 illustrated in FIG. 1 OA is configured by a plurality of squares 121 arranged in an oblique direction so that adjacent squares are different colors (luminance) from each other (a so-called checker pattern). A size S of the pattern 120, for example, is defined by a size of the squares 121. The pattern 120 as described above may be used. Otherwise, as long as the contrast of the photographed image of the pattern photographed by the CCD camera can be properly calculated, the configuration of the pattern is not limited.

For example, a plurality of unit shapes (shapes serving as the unit) may be arranged in two axial directions orthogonal to each other. The pattern is formed so that in each axial direction, adjacent shapes are different colors (luminance) from each other, i.e., the luminance changes at a boundary between the adjacent shapes. The unit shapes are not limited and can be arbitrary. Further, the shapes that are arranged in the pattern can be different shapes instead of all of the shapes being exactly the same. The size of the pattern is defined by a size of the unit shapes, for example.

Additionally, as in a pattern 130 illustrated in FIG. 10B, a unit shape (rectangle) 131 may be set so as to extend in one axial direction and a plurality of unit shapes 131 may be arranged along an axis orthogonal to the one axial direction. A luminance changing part 132, in which the luminance changes, is set in each of the boundaries between the adjacent unit shapes 131. A size S of the pattern 130 is defined by the unit shape 131.

In addition, a pattern in which a plurality of indefinite shapes is arranged may also be used, the indefinite shapes of the pattern being arranged so that an appropriate number of luminance changing parts of an appropriate size are included in the pattern. In this case, by focusing on one of the plurality of shapes, a pattern size change may be carried out based on a size of the shape.

Adjustment of the focus position of the image forming optical system is not limited to being carried out by adjusting the position of the objective lens. For example, autofocusing may be performed by displacing the entire optical system unit. In addition to the above, arbitrary methods may be employed as a method to focus on the work piece to be photographed. In any case, as described above, controlling the size of the pattern according to the magnification of the image forming optical system enables performance of highly precise autofocusing.

The type of image measuring apparatus to which the autofocus apparatus and autofocus method according to the present invention can be applied is not limited. The present invention can be applied to any type of apparatus that performs measurements or observations and the like using an object image obtained by photographing the work piece, such as a CNC image measuring apparatus, a CNC coordinate measuring apparatus, a hardness tester and the like. Additionally, the present invention can also be applied to a digital microscope which photographs, with a digital camera, enlarged images obtained by an optical microscope.

It is also possible to combine at least two aspects of each of the embodiments described above. Further, the effects of the present invention described above are only exemplary, and other effects may be exhibited.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An autofocus apparatus comprising:
    an image acquirer comprising:
        an optical system configured to form an image of an object at a predetermined magnification and to change the magnification of the image; and
        an image capturer configured to capture the image of the object formed by the optical system;
    a pattern controller comprising:
        a generator comprising a digital micromirror device having a plurality of micromirrors configured to generate a pattern of a plurality of adjacent areas of at least two different luminances, each of a predetermined size by individually controlling the plurality of micromirrors;
        a processor configured to control the generator to change the predetermined size of each of the plurality of adjacent areas; and
        a projector configured to project the pattern generated by the generator onto the object; and
    a focus controller configured to control a focus position of the optical system with a desired focusing precision based on the image of the object captured by the image capturer, which includes the pattern of the plurality of adjacent areas of at least two luminances, when the predetermined size of the adjacent areas is within a permitted range, by calculating a contrast in the image, wherein
    the predetermined size of each adjacent area
        increases when the optical system increases the magnification of the image and the processor does not control the generator to change the predetermined size of each adjacent area, and
        decreases when the optical system decreases the magnification of the image and the processor does not control the generator to change the predetermined size of each adjacent area, and
    the processor controls the generator to change the predetermined size of each adjacent area to fall within the permitted range by:

decreasing the predetermined size when the optical system increases the magnification of the image, and increasing the predetermined size when the optical system decreases the magnification of the image, to render the contrast in the image that includes the pattern of the plurality of adjacent areas of at least two luminances to be sufficient to permit the focus controller to control the focus position of the optical system with the desired focusing precision.

2. The autofocus apparatus according to claim 1, wherein the generator is further configured to change the size of the pattern according to a change in the magnification of the optical system.

3. The autofocus apparatus according to claim 2, wherein the generator is further configured to:

decrease the size of the pattern in accordance with an increase of the magnification of the optical system, and increase the size of the pattern in accordance with a decrease of the magnification of the optical system.

4. The autofocus apparatus according to claim 2, wherein the generator is further configured to change the size of the pattern such that the size of the formed pattern image is substantially constant even when the magnification of the optical system is changed.

5. The autofocus apparatus according to claim 3, wherein the generator is further configured to change the size of the pattern such that the size of the formed pattern image is substantially constant even when the magnification of the optical system is changed.

6. The autofocus apparatus according to claim 1, wherein the digital micromirror device is configured to generate the pattern in a changed size based on incident light.

7. The autofocus apparatus according to claim 2, wherein the digital micromirror device is configured to generate the pattern in a changed size based on incident light.

8. The autofocus apparatus according to claim 3, wherein the digital micromirror device is configured to generate the pattern in a changed size based on incident light.

9. The autofocus apparatus according to claim 4, wherein digital micromirror device is configured to generate the pattern in a changed size based on incident light.

10. The autofocus apparatus according to claim 5, wherein digital micromirror device is configured to generate the pattern in a changed size based on incident light.

11. An autofocus method comprising:

forming an image of an object to be photographed by an optical system and changing the magnification of the image;

generating a pattern of a plurality of adjacent areas of at least two different luminances, each of a predetermined size, by individually controlling a plurality of micromirrors;

projecting the pattern onto the object;

controlling a focus position of the optical system with a desired focusing precision based on a photographed image of the projected pattern, which includes the pattern of the plurality of adjacent areas of at least two luminances, when the predetermined size of the adjacent areas is within a permitted range, by calculating a contrast in the image;

changing the predetermined size of each adjacent area to fall within the permitted range by decreasing the predetermined size when the changing operation increases the magnification of the image, and increasing the predetermined size when the changing operation decreases the magnification of the image, to render the contrast in the image that includes the pattern of the plurality of adjacent areas of at least two luminances to be sufficient to permit the controlling operation to control the focus position of the optical system with the desired focusing precision; and forming, by the optical system at the changed magnification, the image of the projected pattern.

12. A non-transitory computer-readable storage medium that stores a program for execution by an autofocus apparatus, the program product causing the computer to execute a process comprising:

detecting a magnification of an optical system forming an image of an object, and changing the magnification of the image;

generating a pattern of a plurality of adjacent areas of at least two different luminances, each of a predetermined size, by individually controlling a plurality of micromirrors, the predetermined size of each adjacent area increasing when the optical system increases the magnification of the image without the predetermined size being changed by a calculating operation, the predetermined size of each adjacent area decreasing when the optical system decreases the magnification of the image without the predetermined size being changed by the calculating operation;

generating the pattern by individually controlling a plurality of micromirrors;

projecting the pattern onto the object;

controlling a focus position of the optical system with a desired focusing precision based on a photographed image of the projected pattern, which includes the pattern of the plurality of adjacent areas of at least two luminances, when the predetermined size of the adjacent areas is within a permitted range, by calculating a contrast in the image;

calculating a size of each adjacent area of the pattern to fall within the permitted range by decreasing the predetermined size when the changing operation increases the magnification of the image, and increasing the predetermined size when the changing operation decreases the magnification of the image, to render the contrast in the image that includes the pattern of the plurality of adjacent areas of at least two luminances to be sufficient to permit the controlling operation to control the focus position of the optical system with the desired focusing precision; and forming, by the optical system at the changed magnification, the image of the projected pattern.

* * * * *